United States Patent
Asano

(10) Patent No.: US 10,291,097 B2
(45) Date of Patent: May 14, 2019

(54) BRUSHLESS MOTOR AND APPARATUS USING THE SAME

(71) Applicant: CANON KABUSHIKI KAISHA, Tokyo (JP)

(72) Inventor: Kota Asano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 194 days.

(21) Appl. No.: 15/160,122

(22) Filed: May 20, 2016

(65) Prior Publication Data
US 2016/0344256 A1   Nov. 24, 2016

(30) Foreign Application Priority Data
May 21, 2015 (JP) .................................. 2015-103313

(51) Int. Cl.
*H02K 5/16* (2006.01)
*H02K 7/08* (2006.01)
*H02K 7/116* (2006.01)

(52) U.S. Cl.
CPC ............. *H02K 7/116* (2013.01); *H02K 5/161* (2013.01); *H02K 7/083* (2013.01); *H02K 2205/03* (2013.01)

(58) Field of Classification Search
CPC .......... H02K 3/47; H02K 5/161; H02K 7/083; H02K 11/215; H02K 29/08; H02K 5/1672;
(Continued)

(56) References Cited

U.S. PATENT DOCUMENTS

| 5,744,894 A * | 4/1998 | Cho ................... H02K 29/08 |
| | | 310/156.05 |
| 5,886,438 A * | 3/1999 | Kawanishi ............. F16C 17/08 |
| | | 310/194 |

(Continued)

FOREIGN PATENT DOCUMENTS

| JP | 56157236 A * 12/1981 | ............. H02K 5/161 |
| JP | S58150357 U   10/1983 | |

(Continued)

OTHER PUBLICATIONS

Tsutsumi, Machine Translation of JP56157236, Dec. 1981.*
(Continued)

*Primary Examiner* — Quyen P Leung
*Assistant Examiner* — Eric Johnson
(74) *Attorney, Agent, or Firm* — Rossi, Kimms & McDowell LLP

(57) ABSTRACT

A brushless motor includes a case fixed onto a yoke to cover an outer surface of the yoke except one end of the yoke in the axial direction, a frame fixed onto the one end of the yoke, a first bearing fixed onto the frame and configured to rotatably support a first end of a rotating shaft in the axial direction, a second bearing fixed onto the case, and configured to rotatably support a second end of the rotating shaft which is closer to the magnet than the first end, the second bearing including a receiving surface that contacts the second end in the axial direction, an energizing member configured to force the rotating shaft from a first bearing side to a second bearing side, and a wiring substrate disposed between the stator and the case in the axial direction and configured to electrify the coil.

10 Claims, 6 Drawing Sheets

(58) Field of Classification Search
CPC ...... H02K 2205/03; H02K 5/16; H02K 5/163;
H02K 7/08; H02K 7/081; H02K 7/085;
H02K 7/116; H02K 7/1163; H02K 7/1166
USPC .............. 310/90, 156.05, 216.002–216.003,
310/40 MM, 83
See application file for complete search history.

(56) References Cited

U.S. PATENT DOCUMENTS

| | | | | |
|---|---|---|---|---|
| 6,424,061 | B1* | 7/2002 | Fukuda | H02K 29/08 |
| | | | | 310/49.11 |
| 2003/0234586 | A1* | 12/2003 | Iwase | H02K 1/06 |
| | | | | 310/49.32 |
| 2004/0007924 | A1* | 1/2004 | Ogawa | H02K 1/145 |
| | | | | 310/49.08 |
| 2005/0057105 | A1* | 3/2005 | Kasahara | H02K 1/145 |
| | | | | 310/257 |
| 2006/0238050 | A1 | 10/2006 | Matsushita et al. | |
| 2006/0284496 | A1* | 12/2006 | Mizumaki | F16H 25/2409 |
| | | | | 310/49.47 |
| 2008/0088209 | A1* | 4/2008 | Ryu | H02K 7/06 |
| | | | | 310/49.01 |
| 2009/0127955 | A1* | 5/2009 | Kasai | H02K 5/1672 |
| | | | | 310/90 |
| 2010/0001600 | A1 | 1/2010 | Shimoyama | |
| 2011/0291532 | A1* | 12/2011 | Takeuchi | H02K 15/12 |
| | | | | 310/68 B |
| 2013/0026861 | A1* | 1/2013 | Takeuchi | H02K 3/47 |
| | | | | 310/43 |
| 2015/0061442 | A1* | 3/2015 | Tuchiya | H02K 29/08 |
| | | | | 310/156.05 |

FOREIGN PATENT DOCUMENTS

| | | | |
|---|---|---|---|
| JP | H105505299 A | | 8/1993 |
| JP | 06133520 A | * | 5/1994 |
| JP | H108182294 A | | 7/1996 |
| JP | 9308174 A | | 11/1997 |
| JP | 09322510 A | * | 12/1997 |
| JP | 10098853 A | | 4/1998 |
| JP | 2000324785 A | | 11/2000 |
| JP | 2002112516 A | | 4/2002 |
| JP | 2002136034 A | | 5/2002 |
| JP | 2003259614 A | | 9/2003 |
| JP | 2003333818 A | | 11/2003 |
| JP | 2005218147 A | | 8/2005 |
| JP | 2010016923 A | | 1/2010 |
| JP | 2013240174 A | * | 11/2013 |

OTHER PUBLICATIONS

Tsuruta, Machine Translation of JP06133520, May 1994.*
Fukushima, Machine Translation of JP09322510, Dec. 1997.*
Office Action issued in Japanese Application No. 2015-103313 dated Jan. 22, 2019. English translation provided.

* cited by examiner

BRUSHLESS MOTOR AND APPARATUS USING THE SAME

BACKGROUND OF THE INVENTION

Field of the Invention

The present invention relates generally to a brushless motor, and more particularly to a brushless motor having a rotating shaft provided with a leadscrew and a gear.

Description of the Related Art

A variety of apparatuses or optical apparatuses, such as a camera and an interchangeable lens, includes a small motor, such as a stepping motor, a coreless motor, and an inner rotor magnet type brushless motor.

Japanese Patent Laid-Open No. ("JP") 2010-016923 discloses a stepping motor that includes a rotor that has a leadscrew (output section) attached rotating shaft and a magnet, and a stator that has a coil and a stator core enclosing the coil and disposed around the magnet. A frame configured to hold a bearing that rotatably supports an end of the rotating shaft on the output section side is fixed onto one end surface of the stator core in its axial direction. The end of the rotating axis on the magnet side is rotatably supported by a bearing held between the other end surface of the stator core in the axial direction and a metal plate (end plate) fixed onto the stator core. A flat spring is attached to the frame, and configured to force the end of the rotating shaft on the output section side toward the end on the magnet side.

JP 2003-333818 discloses an inner rotor magnet type brushless motor in which a stator having a coil and yoke is located around a rotor magnet of an inner rotor that has a rotating shaft with a tip to which an output member, such as a gear, can be attached. The rotating shaft is rotatably supported by the bearing held by a tip flange and a distal flange. The tip flange is attached to the tip of a case configured to cover an outer circumferential surface of the stator, and the distal flange is attached to the distal end of the case in the axial direction. This motor has a small diameter part located at one end of the rotor magnet in the axial direction, and smaller than that of another part, and includes a Hall element disposed between the small diameter part and the inner circumferential surface of the coil. The Hall element is mounted on a Hall element substrate disposed between the rotor magnet and the distal flange in the axial direction.

The leadscrew attached rotating shaft and the frame configured to support it disclosed in JP 2010-016923 are applicable to the brushless motor disclosed in JP 2003-333818. However, when the frame disclosed in JP 2010-016923 is simply fixed onto the tip flange of the motor of JP 2003-333818, the motor overall length including the frame in the axial direction increases. In addition, it is necessary to improve the assembly precision of the entire motor, such as positioning precisions of the rotor having the output section attached rotating shaft and the stator.

SUMMARY OF THE INVENTION

The present invention provides a brushless motor and an apparatus using the same, which can realize a smaller configuration and improve an assembly precision, even when the brushless motor includes a rotating shaft having an output section and a frame supporting it.

A brushless motor according to one aspect of the present invention includes a rotor that includes a rotating shaft provided with an output section, and a magnet fixed onto the rotating shaft, a stator that includes a yoke that has two openings in an axial direction of the rotating shaft, and a coil provided on an inner circumference of the yoke, and the stator being disposed around the magnet, a case fixed onto the yoke and configured to cover an outer surface of the yoke except one end of the yoke in the axial direction, a frame fixed onto the one end of the yoke, a first bearing fixed onto the frame and configured to rotatably support a first end of the rotating shaft in the axial direction, a second bearing fixed onto the case and configured to rotatably support a second end of the rotating shaft which is closer to the magnet than the first end, the second bearing including a receiving surface that contacts the second end in the axial direction, an energizing member configured to energize the rotating shaft in a direction from the first bearing to the second bearing, and a wiring substrate disposed between the stator and the case in the axial direction and configured to electrify the coil.

Further features of the present invention will become apparent from the following description of exemplary embodiments with reference to the attached drawings.

DESCRIPTION OF THE EMBODIMENTS

Exemplary embodiments of the present invention will hereinafter be described with reference to the accompanying drawings.

First Embodiment

Figure 1:
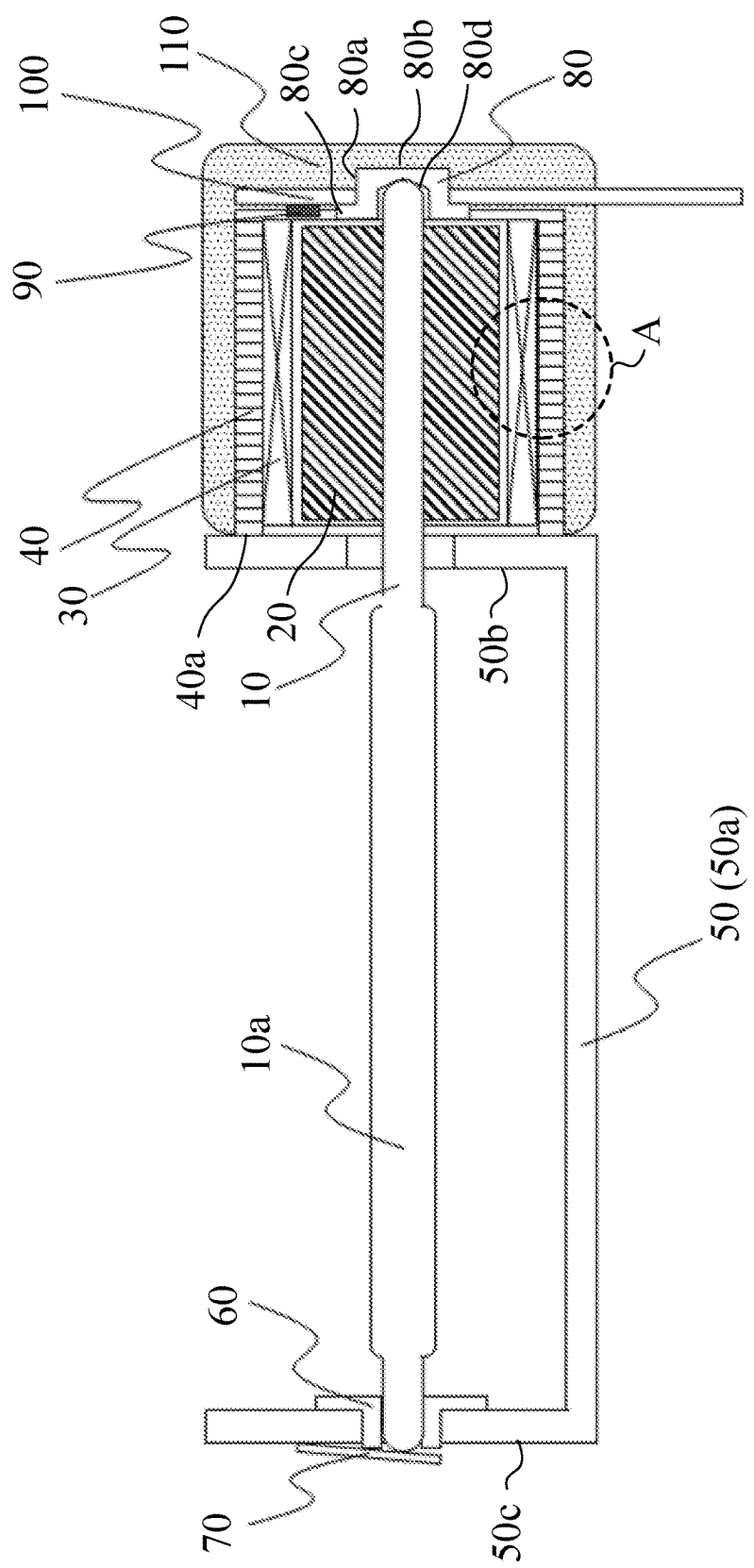
FIG. 1 is a sectional view of a brushless motor according to a first embodiment of the present invention.
Figure 2:
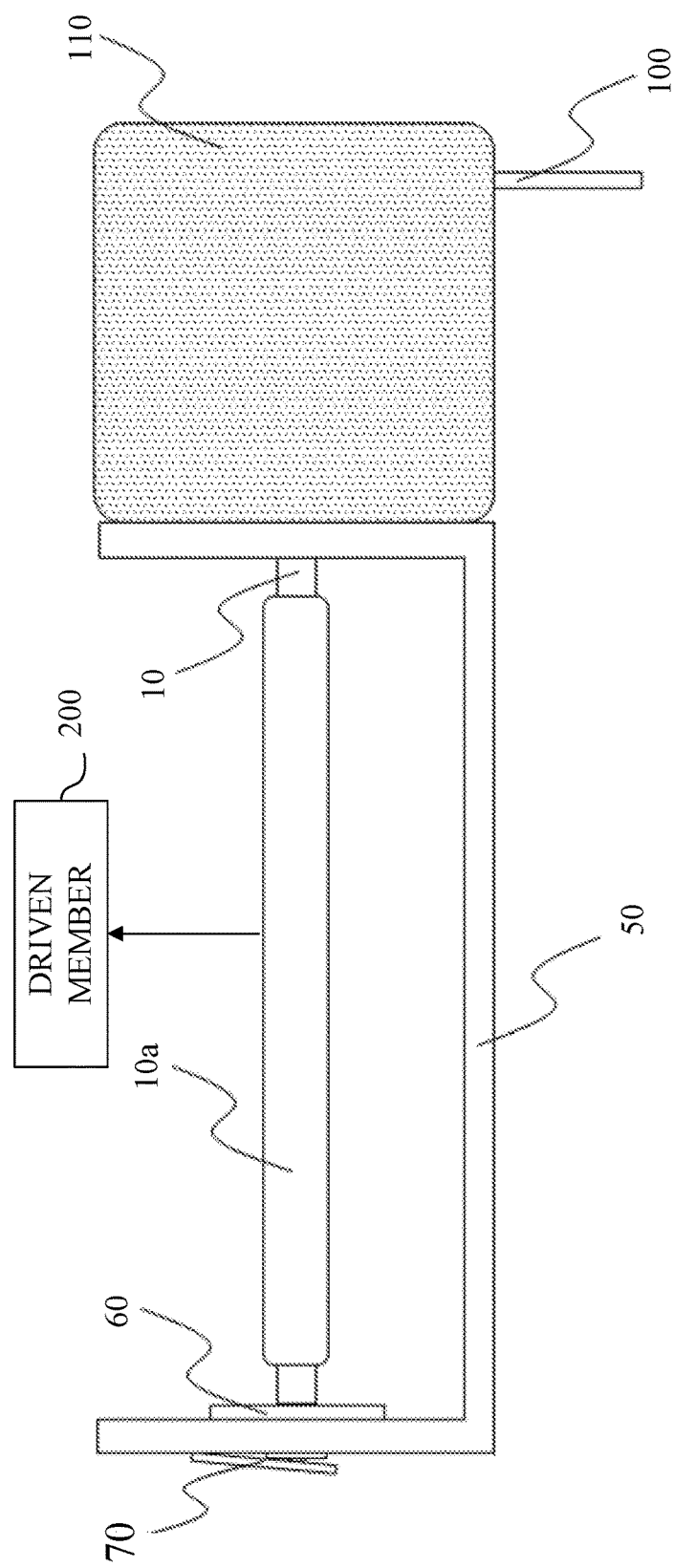
FIG. 2 is an overview of the motor according to the first embodiment.

Referring to FIGS. 1 and 2, a description will be given of an inner rotor magnet type brushless motor (simply referred to as a "motor" hereinafter) according to a first embodiment of the present invention. FIG. 1 illustrates a section taken along a motor shaft direction of a motor, which will be described later, and FIG. 2 is an overview of the motor. Reference numeral 10 denotes a rotating shaft and reference numeral 10a denotes a leadscrew that serves as an output section and is integrated with the rotating shaft 10. The rotating shaft 10 is made by forming the shape of the leadscrew 10a through rolling machining onto a metal rod member, such as SUS. In the following description, an extending direction of the rotating shaft 10 will be referred to as a motor shaft direction, a direction orthogonal to the motor shaft direction will be referred to as a diameter direction, and a rotating direction around the motor shaft direction will be referred to as a circumferential direction.

As illustrated in FIG. 2, an unillustrated rack provided to an optical adjuster (driven member) 200, such as a lens, is engaged with the leadscrew 10a. As the leadscrew 10a rotates, the optical adjuster 200 moves in the motor shaft direction.

Reference numeral 20 denotes a magnet, which is fixed onto a magnet fixing section of the rotating shaft 10 in which the leadscrew 10a is not formed. This embodiment forms the cylindrical magnet 20 by combining four magnets with one another each having a quarter cylindrical shape in the circumferential direction, and totally four poles of N and S poles are alternately magnetized on the outer circumferential surface of the magnet 20. The magnet 20 may use an integrated cylindrical magnet instead of quarterly divided, cylinder magnets as in this embodiment. The magnet 20 and the rotating shaft 10 are fixed together by press fitting or bonding between the rotating shaft 10 and the inner circumferential part of the magnet 20. The rotating shaft 10 and the magnet 20 constitute a rotor of the motor.

Figure 3:
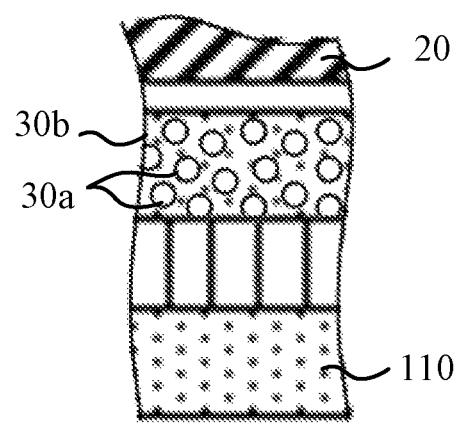
FIG. 3 is an enlarged view of an A part in FIG. 1.

Reference numeral 30 denotes a field coil disposed around the magnet 20, which generates a rotating magnetic field to rotate the rotor by receiving a supply of the current from an unillustrated driving circuit. Reference numeral 40 denotes a yoke disposed on the outer circumference of the field coil 30. In this embodiment, the yoke 40 has a cylindrical shape made of a plurality of ring-shaped magnetic steel plates stacked in the motor shaft direction, with both ends open in the motor shaft direction. In other words, yoke 40 has two open ends (two openings) in an axial direction of the rotating shaft. The field coil 30 and the yoke 40 are integrally molded by resin molding, and form a stator of the motor. FIG. 3 schematically illustrates and enlarges a part enclosed by a broken line in FIG. 1. Reference numeral 30a denotes a winding wire of the field coil, and resin 30b is filled and hardened among the winding wires 30a.

The field coil 30 is as long as the magnet 20 in the motor shaft direction. The yoke 40 is slightly longer than each of the magnet 20 and the field coil 30 in the motor shaft direction. No resin is provided by resin molding on an end 40a of the yoke 40 on a side of the leadscrew 10a of the rotating shaft 10 (on an output section or leadscrew side hereinafter), and the end 40a exposes before the frame 50 which will be described later is fixed onto the end 40a.

The frame 50 is a member used to attach the motor to the body of the optical apparatus, such as a camera and an interchangeable lens, which includes the optical adjuster 200. The frame 50 is made by bending a nonmagnetic steel plate so as to form a base section 50a that extends in the motor shaft direction and bent rises 50b and 50c at both sides of the base section 50a. The bent rise 50b on the side closer to the stator (field coil 30 and the yoke 40) and the magnet 20 (referred to as a magnet side hereinafter) is fixed onto the end surface 40a of the yoke 40 on the leadscrew side (which is the exposing end surface uncovered by resin) through welding or bonding. In other words, the frame 50 is directly welded or bonded onto the open end or one end of the yoke 40 in the motor shaft direction. This configuration can shorten the motor overall length that contains the frame 50 in the motor shaft direction rather than a case where another member is disposed between the frame 50 and the yoke 40 and a case where the frame 50 is fixed onto a closed end of the yoke that encloses the coil. The frame 50 may be made of a nonmagnetic material other than a nonmagnetic steel plate, such as resin.

A leadscrew side bearing 60 as a first bearing is configured to rotatably support the tip or end of the rotating shaft 10 on the output section side and fixed onto the leading part 50c on the leadscrew side by press fitting. The flat spring 70 as an energizing member is attached to the leading part 50c. The plate spring 70 contacts the tip of the rotating shaft 10 and forces the rotating shaft from the leadscrew side to the magnet side or from the first bearing side to the second bearing side, which will be described later.

Reference numeral 80 denotes a magnet side bearing as a second bearing configured to rotatably support the back end of the rotating shaft 10 or its end on the magnet side. The back end of the rotating shaft 10 has a semispherical shape. A receiving surface 80d in the magnet side bearing 80 which the back end of the rotating shaft 10 contacts is formed as a conical concave surface having a center aligned with the center axis of the rotating shaft 10 or a rotationally symmetrical surface that inclines relative to the motor shaft direction. When the semispherical back end of the rotating shaft 10 is forced against the magnet side bearing 80 by the flat spring 70 and contacts the receiving surface 80d as the conical concave surface of the magnet side bearing 80, the central axis of the rotating shaft 10 is less likely to displace and the rotating shaft 10 can smoothly rotate. Thereby, a rotating amount of the rotating shaft 10 can be precisely transmitted to the optical adjuster 200 when the motor is driven. In addition, when the motor is forwardly driven or reversely driven, the rotating shaft 10 is less likely to vibrate in a direction orthogonal to the motor shaft direction and less likely to collide with the inner surface of the magnet side bearing 80. Therefore, tapping noises can be restrained.

This embodiment provides the leadscrew 10a as the output section to the rotating shaft 10. The leadscrew 10a drives the driven member parallel to the motor shaft direction via the rack, and the reaction affects the entire rotor containing the rotating shaft in the motor shaft direction. The reaction is repeated whenever the motor is forwardly driven and reversely driven. The flat spring 70 forces the rotating shaft 10 against the magnet side bearing 80 provided on one side in the motor shaft direction, and restrains a displacement of the rotor in the motor shaft direction. This configuration can prevent collision noises that would otherwise occur due to collisions between the rotor displacing in the motor shaft direction and (the bent rise 50b of) the frame 50 and the magnet side bearing 80. In particular, when the motor according to this embodiment is applied to a camera that can capture a motion image, collision noises can be prevented from being recorded in image capturing.

Reference numeral 90 denotes a Hall element as a magnetic sensor configured to detect a rotation of a rotor (magnet 20). The Hall element 90 detects a change of a magnetic flux density from the magnet 20 and outputs a Hall signal as the motor is driven. Using this Hall signal, an unillustrated controller can detect the rotating position of the rotor and control the electrification to the field coil 30 from the unillustrated driving circuit. The Hall element 90 is provided opposite to an end surface of the magnet 20 in the motor shaft direction (or its end surface opposite to the leadscrew side or a "magnetic flux detecting surface" hereinafter). Although FIG. 1 illustrates only one Hall element 90, totally three Hall elements (including two additional unillustrated Hall elements) are actually arranged at regular intervals in the circumferential direction.

Reference numeral 100 denotes a wiring substrate (simply referred to as a "substrate" hereinafter), mounted with the Hall element 90 and wirings (such as an FPC) configured to electrify the field coil 30 from the driving circuit, and held in a plane shape by a stiffener. The substrate 100 has a hole or opening equal to or slightly larger than an outer diameter of a cylinder (first part) 80a having the receiving surface 80d in the magnet side bearing 80, and the cylinder of the magnet side bearing 80 is inserted into this hole. Thereby, the substrate 100 overlaps the magnet side bearing 80 in the motor shaft direction, and is located on the leadscrew side of at least part of the magnet side bearing 80 (the end surface 80b of the cylinder 80a). The magnet side bearing 80 has a flange part (second part) 80c that extends in the (diameter) direction orthogonal to the motor shaft direction from the cylinder 80a. The substrate 100 is disposed between the flange part 80c and the case 110, which will be described later, in the motor shaft direction.

This configuration can position the substrate 100 in the motor shaft direction. In particular, when the Hall element 90 is mounted on the substrate 100 as in this embodiment, a proper gap can be set and maintained between the Hall element 90 and the end surface of the magnet 20.

The case 110 is made of resin, and configured to cover the outer surface of the yoke 40 (outer circumference surface and the end surface of the magnet side) except for the end surface 40a of the yoke 40 on the leadscrew side. The case 110 also covers the end surfaces of the field coil 30, the magnet 20, and the magnet side bearing 80 on the magnet side. This embodiment integrally fixes, through resin molding, the case 110, the stator in which the field coil 30 is integrally molded into the yoke 40, the magnet side bearing 80, and the substrate 100 that includes the Hall element 90. This configuration, forcing of the rotating shaft 10 by the flat spring 70, and the (cone concave surface) shape of the magnet side bearing 80 can reduce the assembly errors among these components, and maintain the motor assembly precision and finally the control precision of the rotating position of the motor. As a result, this configuration can improve the control precision of positioning the optical adjuster 200 to be driven by the motor.

Even when an external force is applied to the substrate 100 that extends from the inside of the case 110 to the outside, such as a force applied by a camera assembler when he holds the camera, the external force is unlikely to transmit to the Hall element 90 and the wirings. Hence, a positional shift of the Hall element and a wiring disconnection in the motor are less likely to occur.

Figure 4A:
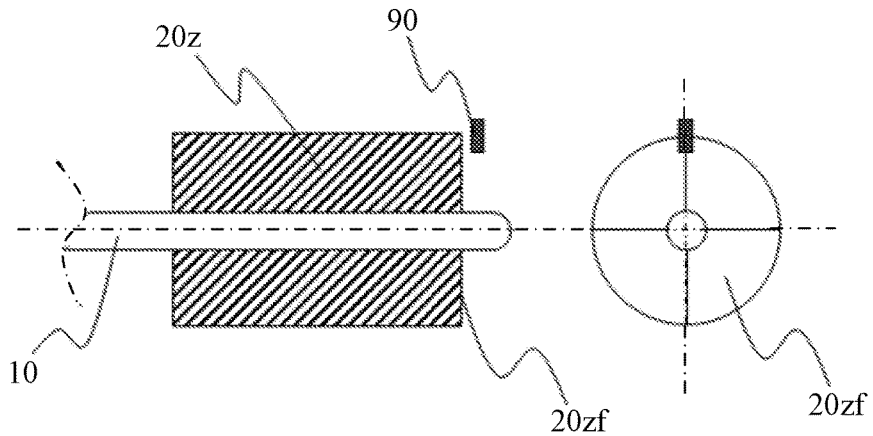
FIGS. 4A to 4C are views illustrating shapes of magnets in a conventional motor and the motor according to the first embodiment.
Figure 4B:
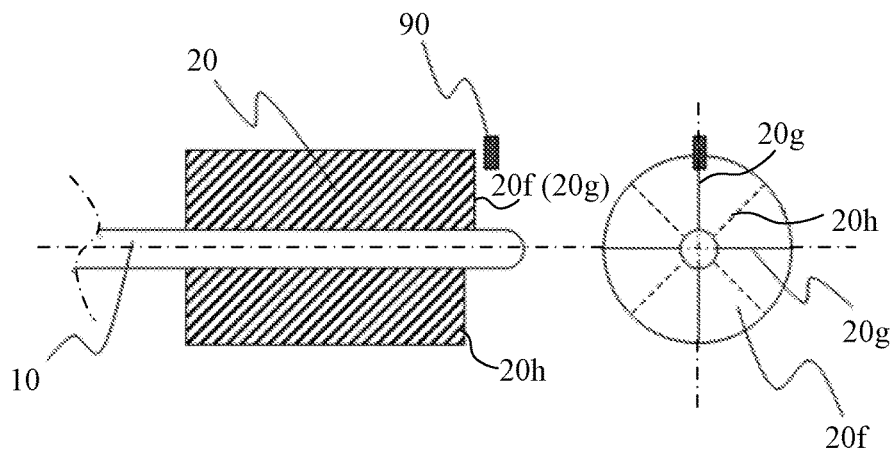
Figure 4C:
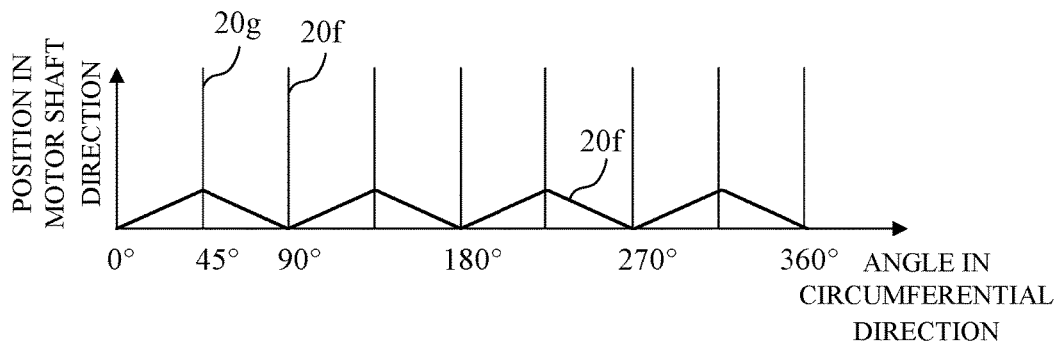

Referring now to FIGS. 4A to 4C, a description will be given of a detailed shape of the magnet 20. FIG. 4A illustrates a positional relationship between a conventional magnet 20z and the Hall element 90. The left view illustrates a positional relationship on a section taken along the motor shaft direction, and the right view illustrates a positional relationship of a magnet 20z and the Hall element 90 viewed from the magnet side bearing 80. The conventional magnet 20z has a cylindrical outer circumferential surface, and a magnetic flux detecting surface 20zf opposite to the Hall element 90 has a flat surface. Therefore, a distance is basically constant between the magnet 20z and the Hall element 90 in the motor shaft direction when the magnet 20z rotates with the rotating shaft 10. This relationship is applied to the motor disclosed in JP 2010-016923, although there is a difference as to whether the Hall element is opposite to outer circumferential surface of the magnet or the Hall element is opposite to the end surface in the motor shaft direction.

FIG. 4B illustrates a positional relationship between the magnet 20 and the Hall element 90 according to this embodiment. The left view illustrates a positional relationship on the section taken along the motor shaft direction, and the right view illustrates a positional relationship of the magnet 20 and the Hall element 90 viewed from the magnet side bearing 80. FIG. 4C illustrates a shape of the magnetic flux detecting surface 20f of the magnet 20 according to this embodiment developed in the circumferential direction and viewed from the diameter direction. The magnet 20 of this embodiment has a cylindrical outer circumferential surface but the magnetic flux detecting surface 20f opposite to the Hall element 90 has heaves in which ridges 20g and grooves 20f are alternately arranged. More specifically, the ridges 20g and grooves 20f are alternately formed every 45° in the circumferential direction, and a constant slope is formed between the ridge and groove. In the left view of FIG. 4B, an upper side of the rotating shaft 10 is a section of the magnet 20 which passes the ridge 20g, and a lower side of the rotating shaft 10 is a section of the magnet 20 which passes the groove 20h.

Figure 5:
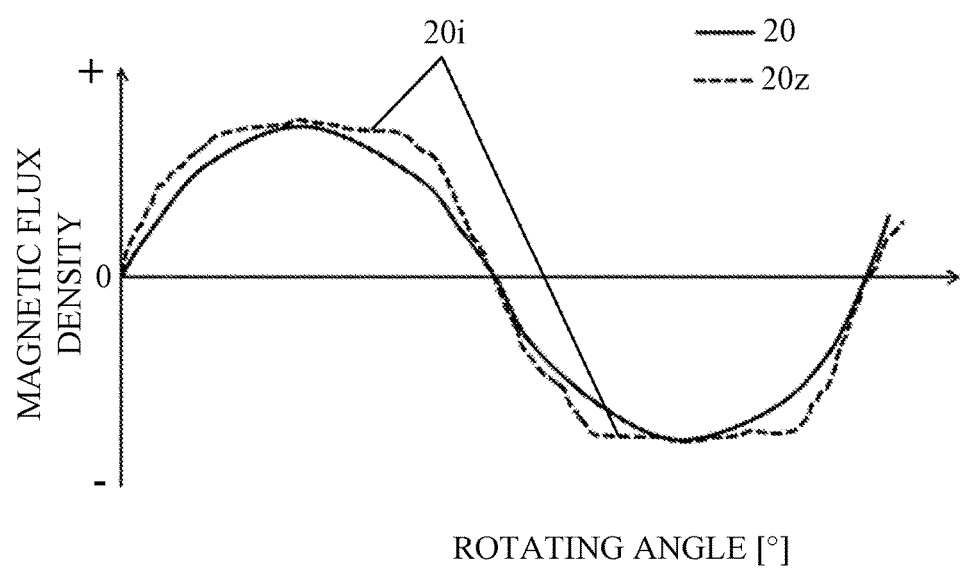
FIG. 5 illustrates magnetic flux density waveforms when each of the above magnets is used.

A distance periodically changes between the magnetic flux detecting surface 20f and the Hall element 90 as the magnet 20 rotates because the magnetic flux detecting surface 20f has periodical heaves in the circumferential direction. FIG. 5 illustrates changes of magnetic flux densities at a position where the Hall element 90 is disposed in FIG. 4A or 4B as the magnets 20z and 20 rotate. In FIG. 5, a broken line indicates a change of a magnetic flux density of the conventional magnet 20z, and a solid line indicates a change of a magnetic flux density of the magnet 20 according to this embodiment.

The magnetic flux density of the conventional magnet 20z changes like an approximate trapezoid, and flat bases 20i are formed near a plus peak and a minus peak. The flat base 20i is a dead band in which the Hall element 90 cannot detect the change of the magnetic flux density, and a rotating position (rotating angle) of the magnet 20z cannot be precisely detected in the length. The conventional configuration compares and turns into a rectangular signal a Hall signal from the Hall element 90 that has detected the change of the magnetic flux density. Then, the conventional configuration detects the rotating position of the rotor and controls the electrification to the field coil 30 from the driving circuit based on a rough period of the leading edge and the trailing edge of the rectangular signal. It is thus difficult to improve the control precision (resolution) of the rotating position of the motor.

On the contrary, the magnet 20 according to this embodiment provides a smooth change of the magnetic flux density that is closer to a sine wave than the conventional magnet 20z. In other words, the magnet 20 eliminates the flat bases 20i of the magnetic flux density that are seen near the plus and minus peaks in the conventional magnet 20z and provides a significant change of the magnetic flux density near the peak. When the Hall element 90 detects a change of the magnetic flux density close to the sine wave, the Hall signal is used as it is or converted into a signal that stepwise changes for each of a plurality of thresholds, so as to detect the rotating position of the rotor and to control the electrification of the field coil 30. This embodiment can sufficiently improve the control precision (resolution) of the rotating position of the motor, and the control precision of positioning the driven member. As described above, when the force of the flat spring 70 compresses the rotating shaft 10 against the receiving surface 80d of the magnet side bearing 80, the distance between the magnetic flux detecting surface 20f and the Hall element 90 in the magnet 20 varies only by the periodic heave of the magnetic flux detecting surface 20f. This embodiment can precisely detect the rotating position of the motor and precisely control driving or stably control positioning of the driven member.

While this embodiment constitutes the rotor by directly fixing the rotating shaft 10 onto the magnet 20, a magnet yoke may be disposed between the rotating shaft 10 and the magnet 20. The magnet yoke may be made of a magnetic material having a cylindrical shape or by stacking a plurality of ring shaped magnetic steel plates like the yoke 40.

Alternatively, instead of the Hall element 90, an MR sensor may be used as the magnetic sensor and mounted on the substrate 100.

Second Embodiment

Figure 6:
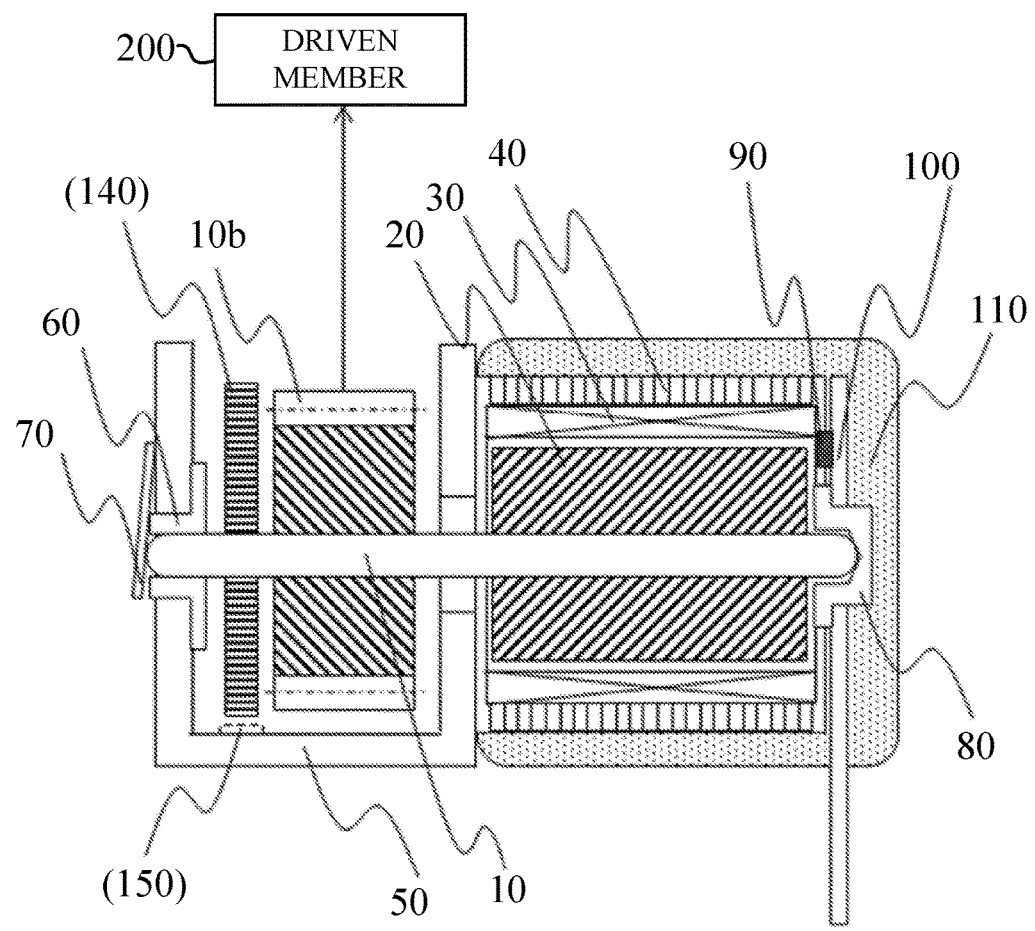
FIG. 6 is a sectional view of a brushless motor according to a second embodiment of the present invention.

FIG. 6 illustrates a structure of an inner rotor magnet type brushless motor according to a second embodiment of the present invention. FIG. 6 illustrates a section of the motor taken along the motor shaft direction similar to FIG. 1.

This embodiment provides a helical gear 10*b* as the output section of the rotating shaft 10. The helical gear 10*b* is integrated and rotatable with the rotating shaft 10 through press fitting or bonding, and forms the rotor with the magnet 20. The output section may include a gear other than the helical gear, as long as it is engaged with the unillustrated driven member and generates a driving force.

The remaining structure is similar to that of the motor according to the first embodiment, and a description thereof will be omitted. This embodiment can also obtain an effect similar to that of the first embodiment.

In order to detect the rotation of the rotor, the MR sensor 150 may be disposed near the magnet 140 for detecting the rotation of the rotor as illustrated in an alternate short and long dash line in FIG. 6, instead of the Hall element 90 configured to detect the rotation of the magnet 20 in the case 110. The magnet 140 is a multi-pole magnetized magnet in which N and S poles are alternately magnetized in the circumferential direction on the outer circumferential surface. The MR sensor 150 outputs an electric signal according to the magnetic field of the magnet 140, and this signal enables the rotating position of the rotor to be detected or the electrification to the field coil 30 to be controlled.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-103313, filed May 21, 2015, which is hereby incorporated by reference herein in its entirety.

What is claimed is:

1. A brushless motor comprising:
   a rotor that includes a rotating shaft provided with an output section, and a magnet fixed onto the rotating shaft, the rotating shaft having a first end and a second end as tip ends in an axial direction of the rotating shaft, the second end being closer to the magnet than the first end;
   a stator that includes a yoke having two openings on an output section side and another side in the axial direction, and a coil provided on an inner circumference of the yoke, the stator being disposed around the magnet, an output section side open end of the yoke being formed so as not to cover an output section side end of the coil and protruding more than the coil and the magnet to the output section side;
   a case fixed onto the yoke and configured to cover an outer surface of the yoke except an output section side open end of the yoke in the axial direction;
   a frame fixed onto the output section side open end of the yoke;
   a first bearing fixed onto the frame and configured to rotatably support the first end of the rotating shaft;
   a second bearing fixed onto the case and configured to rotatably support the second end of the rotating shaft, the second bearing including a receiving surface that contacts the second end in the axial direction;
   an energizing member that contacts the first end to energize the rotating shaft in a direction from the first bearing to the second bearing; and
   a wiring substrate disposed between the stator and the case in the axial direction and configured to electrify the coil.

2. The brushless motor according to claim 1, wherein the frame is welded or bonded directly onto the output section side open end in the yoke.

3. The brushless motor according to claim 1, wherein the stator, the second bearing, and the wiring substrate are fixed onto the case by resin.

4. The brushless motor according to claim 1, wherein the output section includes a leadscrew or a gear.

5. The brushless motor according to claim 1, wherein the second bearing has a first part provided with the receiving surface, and a second part that extends in a direction orthogonal to the axial direction from the first part, and
   wherein the wiring substrate has an opening into which the first part is inserted, and has a part disposed between the case and the second part.

6. The brushless motor according to claim 1, further comprising a magnetic sensor provided on a rotor side surface of the wiring substrate so as to face an end surface of the magnet in the axial direction, and configured to detect a rotation of the rotor.

7. The brushless motor according to claim 6, wherein a part of the end surface of the magnet opposite to the magnetic sensor in the axial direction has periodic heaves in a circumferential direction.

8. The brushless motor according to claim 6, wherein:
   the second bearing includes a flange part extending in a direction orthogonal to the axial direction, and
   the wiring substrate is disposed between the flange part of the second bearing and the case in the axial direction.

9. The brushless motor according to claim 1, wherein the yoke has a cylindrical shape.

10. An apparatus comprising a brushless motor, wherein the brushless motor includes:
    a rotor that includes a rotating shaft provided with an output section, and a magnet fixed onto the rotating shaft, the rotating shaft having a first end and a second end as tip ends in an axial direction of the rotating shaft, the second end being closer to the magnet than the first end;
    a stator that includes a yoke having two openings on an output section side and another side in the axial direction, and a coil provided on an inner circumference of the yoke, the stator being disposed around the magnet, an output section side open end of the yoke being formed so as not to cover an output section side end of the coil and protruding more than the coil and the magnet to the output section side;
    a case fixed onto the yoke and configured to cover an outer surface of the yoke except an output section side open end of the yoke in the axial direction;
    a frame fixed onto the output section side open end of the yoke;
    a first bearing fixed onto the frame and configured to rotatably support the first end of the rotating shaft;
    a second bearing fixed onto the case and configured to rotatably support the second end of the rotating shaft, the second bearing including a receiving surface that contacts the second end in the axial direction;

an energizing member that contacts the first end to energize the rotating shaft in a direction from the first bearing to the second bearing; and a wiring substrate disposed between the stator and the case in the axial direction and configured to electrify the coil.

* * * * *